Aug. 10, 1965

M. FISCHMAN ETAL 3,200,261

BLOCKING OSCILLATOR

Filed Nov. 21, 1961

INVENTORS
MARTIN FISCHMAN
WILLIAM GELLER

BY R. J. Frank

ATTORNEY

United States Patent Office 3,200,261
Patented Aug. 10, 1965

3,200,261
BLOCKING OSCILLATOR
Martin Fischman, Wantagh, and William Geller, Plainview, N.Y., assignors to General Telephone and Electronics Laboratories, Inc., a corporation of Delaware
Filed Nov. 21, 1961, Ser. No. 153,948
7 Claims. (Cl. 307—88.5)

This invention relates to blocking oscillators.

In our copending U.S. patent application Serial No. 808,394, filed April 29, 1959, now Patent 3,038,128 granted June 5, 1962, we disclosed a blocking oscillator in which the pulse width or "on" time of the output voltage is controlled and stabilized by means of a series resonant circuit comprising an inductor and a capacitor. The recovery or "off" time of this oscillator is determined by the capacitor in the series resonant circuit and the resistance through which it discharges. When the oscillator is operating in its triggered mode, the circuit parameters required for effective width control result in a recovery time extending over several pulse widths. This long recovery time is acceptable in many applications but there are other applications, such as pulse regeneration in pulse code modulation systems, in which a short recovery time must be provided in addition to a controlled and stabilized pulse width.

Accordingly it is an object of our invention to provide an improved blocking oscillator in which the pulse width is controlled and stabilized and in which the recovery time may be less than the pulse width.

In the present invention a blocking oscillator is provided in which a resonant circuit, including a capacitor, controls the width and stability of the output pulses. Switching means, controlled by the output pulses, is coupled across the capacitor to control the recovery time of the oscillator between pulses. The switching means provides a substantially open circuit across the capacitor during generation of the output pulse and a substantially short circuit across the capacitor following each pulse.

In particular, the invention comprises first and second transistors, each having first, second and third electrodes, a series resonant circuit including an inductor and a capacitor, and a transformer having at least first, second, and third windings. The first winding of the transformer is coupled between the first and third electrodes of the first transistor, the second winding of the transformer is coupled in series with the series resonant circuit between the first and second electrodes of the first transistor, and the third winding of the transformer is coupled between the first and second electrodes of the second transistor. The first and third electrodes of the second transistor are connected across the capacitor. In addition, means are provided for coupling an input trigger pulse between the first and second electrodes of the first transistor.

As explained in our aforementioned Patent 3,038,128, the series resonant circuit has a resonant frequency which determines the duration, or width, of the output voltage pulses. The current through the resonant circuit is sinusoidal and conducts for one-half of each cycle, each output pulse being initiated at the start of this current flow and cut off abruptly when the current falls to zero. In this way, the width of the output pulse is precisely controlled by the frequency of the series resonant circuit. In order to obtain a sinusoidal current and the resulting precise width control, the resistance shunting the capacitor must be high. However, if the resistance in shunt with the capacitor is high, the time required for the charge to leak off the capacitor is long compared to a pulse width. Thus, in the circuit described in our aforementioned application, the frequency with which trigger pulses may be applied to the circuit is limited by the relatively long recovery time of the oscillator.

In an embodiment of the invention utilizing type PNP transistors, the emitter and collector electrodes of the second transistor are connected across the capacitor. The third winding of the transformer is coupled between the emitter and base of the second transistor. During the interval that the output pulse is generated, the second transistor is cut off by a positive output voltage fed back to its base through the third winding of the transformer. Thus, the second transistor presents an essentially open circuit to the capacitor during generation of the pulse. At the termination of the output pulse, the output voltage changes abruptly in the negative direction and the second transistor is driven into conduction, the second transistor becoming essentially a short circuit across the capacitor. Since the capacitor discharges rapidly through the emitter-collector path of the second transistor, the recovery time of the oscillator is short. Thus, triggering pulses may be applied to the circuit at intervals which are only slightly longer than the pulse width.

The above objects of and the brief introduction to the present invention will be more fully understood and further objects and advantages will become apparent from a study of the following description in connection with the drawings, wherein.

Figure 1:
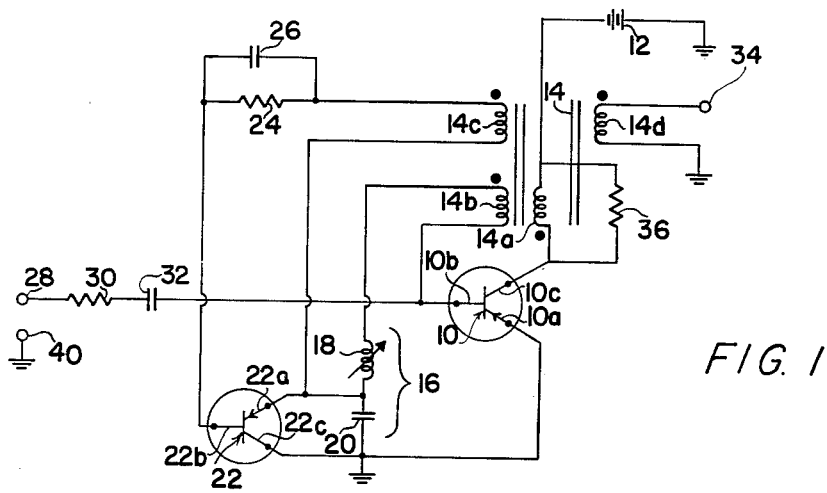
FIG. 1 is a schematic diagram of the invention.

Referring to FIG. 1, there is shown a first type PNP transistor 10 having its emitter electrode 10a grounded and its collector electrode 10c connected to the negative terminal of a battery 12 through the first winding 14a of a transformer 14. A series resonant circuit 16, comprising an inductor 18 and a capacitor 20 is connected between the base 10b and emitter 10a of transistor 10 through a winding 14b of transformer 14. Resonant circuit 16 is adjusted by means of inductor 18 to a frequency having a half-period equal to the desired width, or duration, of the output pulse.

A second type PNP transistor 22 has its emitter 22a connected to the junction of inductor 18 and capacitor 20 and its collector 22c connected to the other end of capacitor 20. A drive control network, comprising a resistor 24 and capacitor 26 in parallel, is connected in series with the third winding 14c of transformer 14 between the emitter 22a and base 22b of transistor 22. An input terminal 28 is coupled to the base of transistor 10 through a series-connected resistor 30 and capacitor 32, and an output terminal 34 is coupled to one end of transformer output winding 14d. A damping resistor 36 is connected across transformer winding 14a.

When there is no signal applied between input terminal 28 and grounded input terminal 40, the base drive to transistor 10 is zero and the transistor is non-conducting. Application of an input trigger pulse $e_t$ (FIG. 2a) between terminals 28 and 40 drives the base of transistor 10 negative with respect to its emitter and transistor 10 conducts. A sinusoidal current $i_r$ (FIG. 2c) begins to flow through the forward biased base-emitter junction of transistor 10, transformer winding 14b, and resonant circuit 16. This current increases from zero, goes through a maximum and then diminishes to zero. With zero base drive, transistor 10 is abruptly changed from its conducting to its non-conducting state and the transistor is turned off.

The application of the input trigger to the base of transistor 10 also produces current flow from the emitter to collector of transistor 10 through transformer winding 14a. The changing current through winding 14a induces changes in the voltage across winding 14b which are fed back to the base of transistor 10 with the proper magnitude and polarity to drive transistor 10 into saturation.

When saturation is reached the transistor voltages remain substantially constant until the base current falls to a low value moving the transistor operating point out of the saturation region into a region of high dynamic gain. The oscillator then reverts to the non-conducting state. The collector to emitter voltage $e_{c1}$ of transistor 10 during the "on" period is shown at 50 in FIG. 2b.

Figure 2:
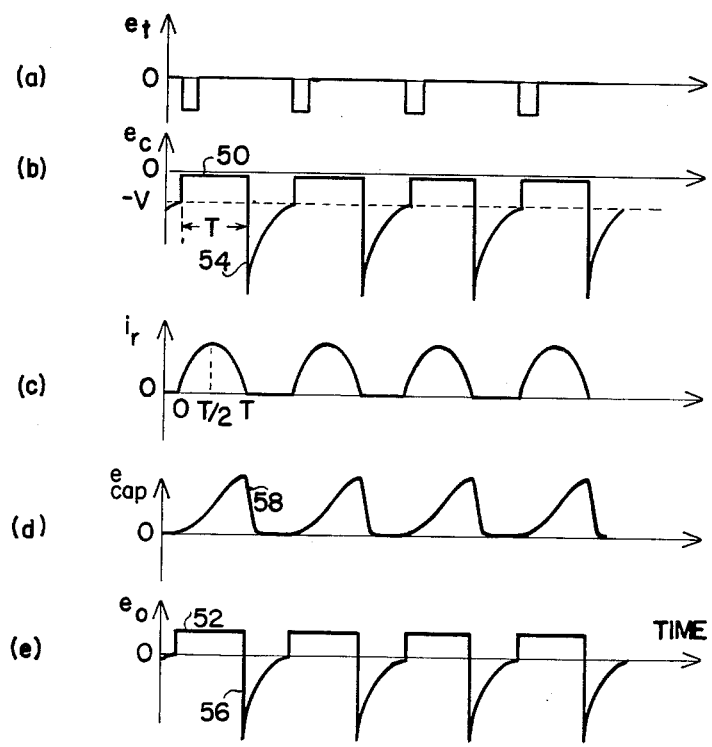
FIG. 2 shows current and voltage waveforms occurring in the circuit of FIG. 1.

The voltage $e_{b2}$ between the base and emitter of the second transistor 22 during the "on" period is shown at 52 in FIG. 2e. This voltage has the same waveform as the collector voltage $e_{c1}$ except that its average value is zero rather than —V. Since the base of type PNP transistor 22 is positive with respect to the emitter during the "on" period, transistor 22 is cut off.

Returning to the current $i_r$ through resonant circuit 16 (FIG. 2c), maximum energy is stored in inductor 18 at time $T/2$. As is evident from the voltage $e_{cap}$ across capacitor 20 (FIG. 2d), all of the energy has been transferred to capacitor 20 at time T, and the charge on capacitor 20 holding transistor 10 cut off. Thus, the recovery time of the oscillator, i.e. the time between pulses, is not limited by the time required to discharge capacitor 20.

The duration of the "on" period T equals $\pi\sqrt{LC}$ where T is the width of the pulse in seconds, L is the inductance of inductor 18 in henries, and C is the capacitance of capacitor 20 in farads.

At the termination of the pulse, the collector voltage $e_{c1}$ of transistor 10 and the base voltage $e_{b2}$ of transistor 22 are driven sharply negative (as shown at 54 and 56 in FIGS. 2b and 2e) as the energy stored in the magnetizing inductance of transformer 14 is dissipated in resistor 36. More specifically, the sudden reversal of the collector voltage $e_{c1}$ and base voltage $e_{b2}$ is caused by the continuing flow of current through winding 14a after transistor 10 has been driven out of conduction. The current through winding 14a continues to flow in the same direction but now passes through resistor 36 reversing the polarities of voltages $e_{c1}$ and $e_{b2}$ and producing the abrupt drops 54 and 56. The negative overshoot 56 drives transistor 22 into conduction and capacitor 20 discharges rapidly through it as shown by the decrease 58 in the voltage $e_{cap}$ of FIG. 2d. Since capacitor 20 discharges at such a high rate, the recovery time depends primarily on the time required to dissipate the energy stored in the magnetizing inductance. By proper choice of resistor 36 this time can be made quite short without exceeding the maximum permissible collector to emitter voltage.

Transformer winding 14d permits D.C. isolation of the load from the oscillator circuit. The voltage $e_0$ across winding 14d has the same wave shape as the collector to emitter voltage of transistor 10 and is also shown in FIG. 2e.

Resistor 24 and capacitor 26 control the drive current between the base and emitter of transistor 22. Initially, capacitor 26 acts as a short circuit permitting a high current to flow thereby driving the transistor rapidly into conduction. After the initial surge capacitor 26 begins to charge reducing the base current.

Typical values for the circuit element used in the invention are as follows:

| | |
|---|---|
| Transistor 10 | Type 2N711. |
| Transistor 22 | Type 2N404. |
| Inductor 18 | 60 microhenries. |
| Capacitor 20 | 100 micromicrofarads. |
| Resistor 24 | 2700 ohms. |
| Capacitor 26 | 150 micromicrofarads. |
| Resistor 30 | 1000 ohms. |
| Capacitor 12 | 100 micromicrofarads. |
| Resistor 36 | 1500 ohms. |

Transformer winding ratio $14a:14b:14c:14d = 3:1:1:1$.
Supply voltage = —6 volts.

Although type PNP transistors were used in the embodiment of the invention described above, type NPN transistors can also be used. Alternatively, one transistor may be a type PNP and the other a NPN as will be recognized by one skilled in the art.

As many changes could be made in the above construction and many different embodiments could be made without departing from the scope thereof, it is intended that all matter contained in the above description or shown in the accompanying drawings, shall be interpreted as illustrative and not in a limiting sense.

What is claimed is:
1. A blocking oscillator for generating voltage pulses comprising
   (a) first and second transistors, each of said transistors having first, second, and third electrodes,
   (b) a series resonant circuit including a capacitor, said series resonant circuit having a resonant frequency which determines the duration of said voltage pulse,
   (c) a transformer having at least first, second, and third windings, the first winding of said transformer being coupled between the first and third electrodes of said first transistor, the second winding of said transformer being coupled in series with said resonant circuit between the first and second electrodes of said first transistor, and said third winding being coupled between the first and second electrodes of said second transistor, and
   (d) means coupling the first and third electrodes of said second transistor across said capacitor.

2. A blocking oscillator for generating voltage pulses comprising
   (a) first and second transistors, each of said transistors having first, second, and third electrodes,
   (b) a series resonant circuit including a capacitor and an inductor, said series resonant circuit having a resonant frequency which determines the duration of said voltage pulses,
   (c) a transformer having at least first, second, and third windings, the first winding of said transformer being coupled between the first and third electrodes of said first transistor, the second winding of said transformer being coupled in series with said resonant circuit between the first and second electrodes of said first transistor, and said third winding being coupled between the first and second electrodes of said second transistor,
   (d) means coupling the first and third electrodes of said second transistor across said capacitor, and
   (e) means for coupling an input trigger voltage between the first and second electrodes of said first transistor.

3. A blocking oscillator for generating voltage pulses comprising
   (a) first and second transistors, each of said transistors having first, second, and third electrodes,
   (b) a series resonant circuit including a capacitor, said series resonant circuit having a resonant frequency which determines the duration of said voltage pulses,
   (c) a transformer having at least first, second, and third windings, the first winding of said transformer being coupled between the first and third electrodes of said first transistor, the second winding of said transformer being coupled in series with said resonant circuit between the first and second electrodes of said first transistor, and said third winding being coupled between the first and second electrodes of said second transistor,
   (d) a damping resistor coupled across one winding of said transformer,
   (e) means coupling the first and third electrodes of said second transistor across said capacitor, and
   (f) means for coupling an input trigger voltage between the first and second electrodes of said first transistor.

4. A blocking oscillator for generating voltage pulses comprising (a) first and second transistors, each of said transistors having first, second, and third electrodes, (b) a series resonant circuit including a first capacitor and an inductor, said series resonant circuit having a resonant frequency which determines the duration of said voltage pulses, (c) a drive control circuit, said drive control circuit including a second capacitor and a resistor connected in parallel, (d) a transformer having at least first, second, and third windings, the first winding of said transformer being coupled between the first and third electrodes of said first transistor, the second winding of said transformer being coupled in series with said resonant circuit between the first and second electrodes of said first transistor, and said third winding being coupled in series with the first and second electrodes of said second transistor and said drive control circuit, (e) a damping resistor coupled across one winding of said transformer, (f) means coupling the first and third electrodes of said second transistor across said first capacitor, and (g) means for coupling an input trigger voltage between the first and second electrodes of said first transistor.

5. The blocking oscillator defined in claim 4 wherein the first, second and third electrodes of said first and second transistors correspond to the emitter, base and collector electrodes respectively and said damping resistor is connected across the first winding of said transformer.

6. A blocking oscillator for generating voltage pulses comprising (a) first and second transistors, each of said first and second transistors having emitter, base, and collector electrodes, (b) a series resonant circuit including a first capacitor and an inductor, said series resonant circuit having a resonant frequency which determines the duration of said voltage pulses, (c) a drive control circuit, said drive control circuit including a second capacitor and a resistor connected in parallel, (d) a transformer having first, second, third and fourth windings, the first winding of said transformer having one end coupled to the collector electrode of said first transistor, the second winding of said transformer being coupled in series with said resonant circuit between the emitter and base electrodes of said first transistor, the third winding of said transformer being coupled in series with said drive control circuit between the base and emitter electrodes of said second transistor, and said fourth winding being adapted for connection to an external load, (e) a damping resistor connected across the first winding of said transformer, (f) means coupling the emitter and collector electrodes of said second transistor across said first capacitor, and (g) means for coupling an input trigger voltage pulse between the emitter and base electrodes of said first transistor.

7. In a blocking oscillator for generating output voltage pulses, a first transistor having first, second and third electrodes, a series resonant circuit including a capacitor, and a transformer having at least first and second windings, said first winding being coupled between the first and third electrodes of said first transistor and said second winding being coupled in series with said resonant circuit between the first and second electrodes of said first transistor, the combination comprising (a) switching means coupled across said capacitor, said switching means having a first substantially open position and a second substantially closed position, and (b) control means coupling said switching means to a winding of said transformer, said control means opening said switching means during generation of said output pulses and closing said switching means to provide a low impedance path across said capacitor between said output pulses.

References Cited by the Examiner
UNITED STATES PATENTS

| | | | |
|---|---|---|---|
| 2,220,712 | 11/40 | Geiger | 331—151 |
| 2,605,424 | 7/52 | Janvrin | 331—148 |
| 2,949,547 | 8/60 | Zimmerman | 307—88.5 |
| 3,013,219 | 12/61 | Fischman | 331—112 |
| 3,038,128 | 6/62 | Fischman et al. | 331—151 X |
| 3,158,751 | 11/64 | Nelson | 331—112 X |

JOHN W. HUCKERT, *Primary Examiner.*